No. 759,512. PATENTED MAY 10, 1904.
H. FRAHM.
METHOD OF MEASURING THE REVOLUTIONS OF ROTATING SHAFTS.
APPLICATION FILED JULY 24, 1901.
NO MODEL.

Witnesses:
Paul Wollenberg.
Arthur Scholz

Inventor:
Hermann Frahm
by [signature]
Attorney.

No. 759,512.

Patented May 10, 1904.

UNITED STATES PATENT OFFICE.

HERMANN FRAHM, OF HAMBURG, GERMANY.

METHOD OF MEASURING THE REVOLUTIONS OF ROTATING SHAFTS.

SPECIFICATION forming part of Letters Patent No. 759,512, dated May 10, 1904.

Application filed July 24, 1901. Serial No. 69,513. (No model.)

*To all whom it may concern:*

Be it known that I, HERMANN FRAHM, a subject of the King of Prussia, German Emperor, and a resident of 14 Holstenplatz, Hamburg-on-the-Elbe, German Empire, have invented a new and useful Method of Measuring the Revolutions of Rotating Shafts, of which the following is an exact specification.

My invention relates to a new and useful method of measuring the revolutions of shafts, and is built up on the physical principle consisting in the peculiar circumstance that elastic materials, as springs, strings, or the like, begin to oscillate in case small forces act upon them in certain intervals, which intervals correspond to the period of oscillations of the material.

It is evident that the period of oscillation of a spring, string, or the like can be altered by changing the length of the material so that each length corresponds to a certain period of oscillation. If now small forces are imparted in certain intervals from a rotating shaft in any convenient manner to such a material, the revolutions of the said shaft can be determined by finding out that length of the material in which the material has the largest oscillations—that is to say, in which the period of the oscillations corresponds to the interval of the imparted forces. It has been found out by experience that the simplest and best way to impart the small forces to the elastic material is to oscillate mechanically the fixed ends of the same in a slight way.

In the accompanying drawings several arrangements are shown for carrying my process into effect.

Figure 1:
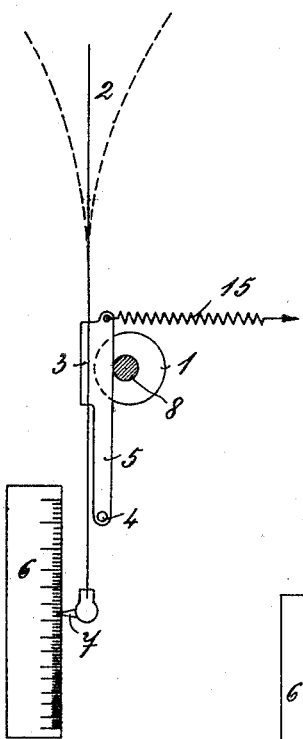
Figure 2:
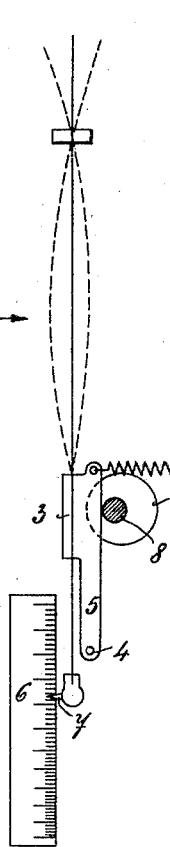
Figure 3:
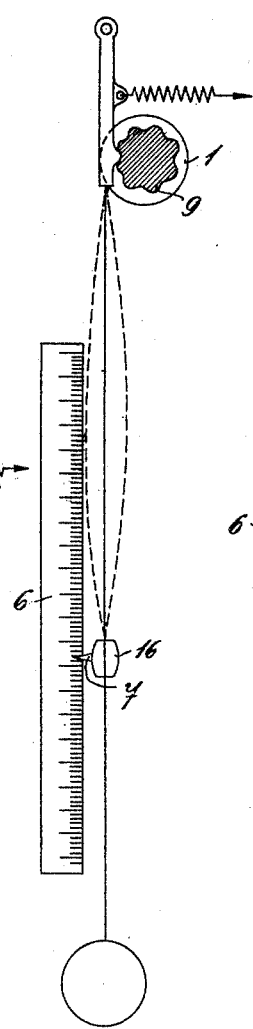
Figure 4:
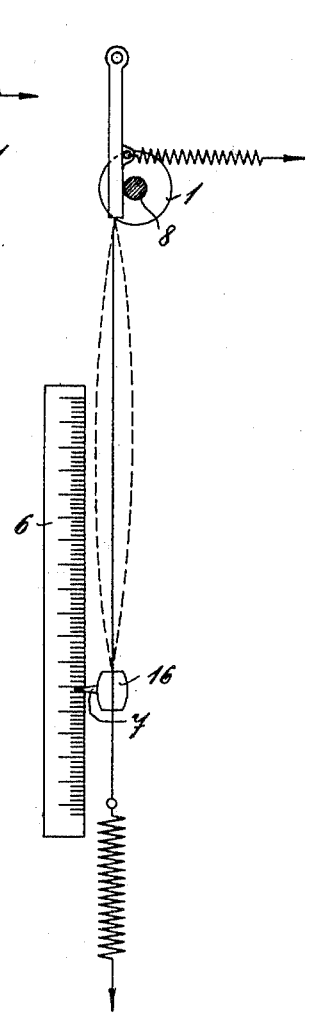

Figure 1 is a diagrammatic view of a device in which a freely-oscillating spring is used. Fig. 2 shows a device in which a spring fixed at both ends is used. Figs. 3 and 4 show how the method is carried into effect by means of a string instead of a spring.

In Fig. 1, 1 is the shaft, the revolutions of which shall be measured. 2 is an elastic spring which can be shifted up and down in the slot 3 of the lever 5, pivoted at 4. By the spring being capable of being moved upward and downward the number of oscillations of the same can be adjusted. The non-oscillating end of the spring is provided with a hand 7, situated upon a scale 6, by means of which arrangement it is attained that the number of oscillations can be found out by the position of the hand 7. The shaft 1, which rotates, is provided with a pin 8, fixed eccentrically to the end of this shaft. The lever 5 is drawn toward the shaft by means of a spring 15. Now by the rotation of the shaft 1 and the lever 5 touching the pin 8 this lever 5 and at the same time the spring 2 are oscillated. It has been found out that the oscillations of the upper part of the spring 2 will increase in that moment in which the oscillation imparted to the same by the pin 8 corresponds to the period of the natural oscillations of the spring 2—that is to say, the period of oscillation of the same when oscillated by its own elasticity. Now in order to find out the number of revolutions of the shaft 1 the spring 2 is shifted upward and downward, thereby finding out the position of the spring in which the oscillations are the largest, whereupon the number of revolutions of the shaft 1 can be found out by the position of the hand 7—that is to say, the number of revolutions can be read off on the scale 6. In shafts rotating very slowly it will be necessary to provide a gearing and an auxiliary shaft, to which the pin 8 is fixed, which gearing connects this auxiliary shaft with the main shaft in order not to be obliged to provide too long springs, or the oscillations of the lever 5 may be attained by providing a disk 9 with several cams, which cams impart the oscillations to the lever 5, as shown, for instance, in Fig. 3. It will be understood that in this case a different scale has to be used. In order to be able to use a scale with greater divisions, it is advisable not to use the oscillations of the free end of a spring, but to use a spring fixed at both ends, as shown in Fig. 2. In this case the divisions of the scale must be twice as large as in the example shown in Fig. 1. It is still more convenient to use instead of springs strings, wires, or the like, which are stretched by means of a weight, as shown in Fig. 3, or a spiral spring, as shown in Fig. 4. In this case a slide 16 is provided which can be moved upward and downward by hand on any convenient device until the point of the maximal oscillations is attained.

It will be understood that instead of springs or strings any other convenient elastic body can be used and that the oscillations can be imparted to the elastic body from the rotating shaft in any convenient manner.

Having thus fully described the nature of this invention, what I desire to secure by Letters Patent of the United States, is—

A method of measuring the number of revolutions of rotating shafts, consisting in imparting by means of the rotating shaft impulses to an elastic body, the rate of vibration of which for varying lengths is predetermined, varying the length of that part of the body, which can be oscillated by the impulses and determining in which length of this part of the body the oscillations imparted to the same by the impulses are the largest, substantially as described and for the purpose set forth.

In testimony whereof I have signed my name to this specification in the presence of two subscribing witnesses.

HERMANN FRAHM.

Witnesses:
E. H. L. MUMMENHOFF,
OTTO W. HELLMRICH.